US012249239B2

(12) United States Patent
Schiegg et al.

(10) Patent No.: US 12,249,239 B2
(45) Date of Patent: Mar. 11, 2025

(54) METHOD FOR PROVIDING A MANEUVER MESSAGE FOR COORDINATING A MANEUVER BETWEEN A ROAD USER AND AT LEAST ONE FURTHER ROAD USER IN A COMMUNICATION NETWORK

(71) Applicant: Robert Bosch GmbH, Stuttgart (DE)

(72) Inventors: Florian Alexander Schiegg, Hildesheim (DE); Ignacio Llatser Marti, Hildesheim (DE); Frank Hofmann, Hildesheim (DE); Florian Wildschuette, Hildesheim (DE); Hendrik Fuchs, Hildesheim (DE); Maxim Dolgov, Renningen (DE); Thomas Michalke, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 347 days.

(21) Appl. No.: 17/773,804

(22) PCT Filed: Sep. 25, 2020

(86) PCT No.: PCT/EP2020/076927
§ 371 (c)(1),
(2) Date: May 2, 2022

(87) PCT Pub. No.: WO2021/089238
PCT Pub. Date: May 14, 2021

(65) Prior Publication Data

US 2022/0392341 A1 Dec. 8, 2022

(30) Foreign Application Priority Data

Nov. 4, 2019 (DE) ..................... 10 2019 216 913.9

(51) Int. Cl.
*G08G 1/0967* (2006.01)
*G08G 1/16* (2006.01)
*G08G 1/09* (2006.01)

(52) U.S. Cl.
CPC ....... *G08G 1/096791* (2013.01); *G08G 1/162* (2013.01)

(58) Field of Classification Search
None
See application file for complete search history.

(56) References Cited

U.S. PATENT DOCUMENTS 8,520,695 B1 8/2013 Rubin et al.
2007/0088489 A1 4/2007 Tsuge
(Continued)

FOREIGN PATENT DOCUMENTS

CN 104966334 A * 10/2015
CN 108335498 A 7/2018
(Continued)

OTHER PUBLICATIONS

International Search Report for PCT/EP2020/076927 Issued Dec. 16, 2020.

(Continued)

*Primary Examiner* — Aniss Chad
*Assistant Examiner* — Madison R. Inserra
(74) *Attorney, Agent, or Firm* — Norton Rose Fulbright US LLP

(57) ABSTRACT

A method for providing a maneuver message for coordinating a maneuver between a road user and at least one further road user in a communication network. The method includes: receiving the communication data and/or the sensor data in the evaluation unit; determining a possible trajectory of the road user based on the communication data and/or the sensor data, at least one trajectory parameter (Continued)

describing a property of the possible trajectory being ascertained; calculating a trajectory transfer priority from the trajectory parameter, the trajectory transfer priority representing a relevance of the at least one possible trajectory for the road user and/or the further road user; determining, based on the trajectory transfer priority, whether the at least one possible trajectory is to be included in a maneuver message; if so: generating the maneuver message including the at least one possible trajectory, and sending the maneuver message via the communication network.

10 Claims, 3 Drawing Sheets

(56) References Cited

U.S. PATENT DOCUMENTS

2015/0138975 A1* 5/2015 Gotz ...................... G08G 1/093
370/235
2016/0025510 A1 1/2016 Belzner et al.
2017/0323562 A1* 11/2017 Rech ...................... G08G 1/162
2020/0387156 A1* 12/2020 Xu ....................... G05D 1/0212
2021/0004024 A1* 1/2021 Whitfield, Jr. ....... G05D 1/0297
2021/0070285 A1* 3/2021 Zuo .................. B60W 30/0953
2021/0146922 A1 5/2021 Fuchs et al.

FOREIGN PATENT DOCUMENTS

DE 102015207977 A1 11/2016
DE 102017209438 A1 * 12/2018 .......... B60W 30/182
DE 102018109883 A1 12/2018
DE 102018109885 A1 12/2018
JP 2018139066 A 9/2018

OTHER PUBLICATIONS

Llatser et al., "Cooperative Automated Driving Use Cases for 5G V2X Communication" 2019 IEEE 2nd 5G Wolrd Forum (5GWF), pp. 120-125. DOI: 10.1109/5GWF.2019.8911628 XP033665226. 6 Pages.

Kenney et al., "LIMERIC-Based DSCR Congestion Control Protocol", vol. 802.11 ETSI ITS, Sep. 18, 2015. IEEE Draft; ITS(15)00149_SAE_LIMERIC_DCC_Presentation, IEEE-SA, Piscataway, NJ USA. 84 Pages.

Huawei, "On demand prioirty change for messages transmission for V2X" vol. SA WGI, No. Tenerife, Spain: Nov. 7, 2016-Nov. 11, 2016, Nov. 10, 2016, 3GPP Draft; S1-163312, 3rd Generation Partnership Project (3GPP), Mobile Competence Centre; 650, Route Des Lucioles; F-06921 Sophia-Antopolis Cedex; Frnace. 2 Pages.

* cited by examiner

METHOD FOR PROVIDING A MANEUVER MESSAGE FOR COORDINATING A MANEUVER BETWEEN A ROAD USER AND AT LEAST ONE FURTHER ROAD USER IN A COMMUNICATION NETWORK

FIELD

The present invention relates to a method, to an evaluation unit, to a computer program, and to a computer-readable medium for providing a maneuver message for coordinating a maneuver between a road user and at least one further road user in a communication network.

BACKGROUND INFORMATION

For an automated control of vehicles that are linked to one another, it is necessary for the vehicles to perceive and interpret their surroundings to be able to make decisions. A range or a field of vision of modern on-board sensors, such as cameras, radar sensors or LIDAR sensors, may, for example, be expanded with a communication from vehicle to pedestrian (V2P), from vehicle to vehicle (V2V), from vehicle to grid (V2G), or from vehicle to network, collectively also referred to as V2X communication.

Services such as Cooperative Awareness or Collective Perception allow stations of such an intelligent transportation system (ITS) to exchange pieces of information about their own states and a state of objects recognized by on-board sensors with one another, by which the stations may perceive their surroundings considerably better. The described services, however, primarily relate to past and current states of objects. A surroundings model, however, is highly dynamic and, in addition to past and current states, also estimates future states of the objects to be able to plan maneuvers accordingly. It would therefore be advantageous if a station could access planned maneuvers of neighboring stations. With this knowledge, an accuracy when estimating future states in the surroundings model could, in some circumstances, be significantly increased.

The European Telecommunications Standards Institute (ETSI) is currently developing a Maneuver Coordination Service (MCS), which is driven, among others, by the publicly financed IMAGinE project, see also in this regard: project "IMAGinE (Intelligent Maneuver Automation—cooperative hazard avoidance in realtime)", https://imagine-online.de/en/; I. Llatser, T. Michalke, M. Dolgov, F. Wildschutte, H. Fuchs, "Cooperative Automated Driving Use Cases for 5G V2X Communication," submitted to IEEE 5G World Forum, 2019.

The Maneuver Coordination Service is based on an exchange of possible trajectories between stations of an intelligent transportation system and is intended to make it possible to coordinate and to harmonize planned trajectories of the stations with one another. For this purpose, costs may be assigned to the possible trajectories, which indicate how advantageous a trajectory is for a vehicle, as is described, for example, in German Patent Application Nos. DE 10 2018 109 883 A1 and DE 10 2018 109 885 A1. Trajectories thus assessed may be periodically transferred in so-called Maneuver Coordination Messages (MCM).

SUMMARY

The present invention provides a method for providing a maneuver message for coordinating a maneuver between a road user and at least one further road user in a communication network, a corresponding evaluation unit, a corresponding computer program, and a corresponding computer-readable medium as recited in the independent claims. Advantageous refinements and improvements of the present invention are derived from the description and the figures.

Specific embodiments of the present invention advantageously allow Maneuver Coordination Messages to be generated, while observing certain rules, by assigning priorities to individual trajectories and associated descriptive data. Based on the priorities, trajectories to be transferred may then be selected, for example by a priority-based transfer protocol, also referred to as Decentralized Congestion Control (DCC), which selects trajectories to be transferred from the trajectories provided with priorities as a function of a V2X channel load. In other words, these rules allow a transfer frequency of the Maneuver Coordination Messages to be controlled as a function of a message content to be transferred. In this way, a maneuver coordination between multiple road users which are linked to one another may be improved.

A first aspect of the present invention relates to a method for providing a maneuver message for coordinating a maneuver between a road user and at least one further road user in a communication network. The road user and the at least one further road user are linked to one another via the communication network. The road user includes an evaluation unit for evaluating communication data received via the communication network and/or sensor data generated by a sensor system for detecting surroundings of the road user, and for transferring maneuver messages via the communication network. In accordance with an example embodiment of the present invention, the method includes the following steps: receiving the communication data and/or the sensor data in the evaluation unit; determining at least one possible trajectory of the road user based on the communication data and/or the sensor data, at least one trajectory parameter describing a property of the at least one possible trajectory being ascertained; calculating a trajectory transfer priority from the trajectory parameter, wherein the trajectory transfer priority represents a relevance of the at least one possible trajectory for the road user and/or the further road user; determining, based on the trajectory transfer priority, whether the at least one possible trajectory is to be included in a maneuver message; if so: generating the maneuver message including the at least one possible trajectory, and sending the maneuver message via the communication network.

A road user may, for example, be understood to mean a motor vehicle, such as a passenger car, a truck, a bus or a motorcycle, an element of a traffic infrastructure, also referred to as roadside unit, a bicycle, a kick scooter, or a pedestrian.

The evaluation unit may, for example, be a component of an on-board computer of the road user, for example of a vehicle. Furthermore, the evaluation unit may be designed to control, for example to steer, to decelerate and/or to accelerate, the road user based on the communication data and/or the sensor data. For this purpose, the road user may include an actuator system, which is activatable by the evaluation unit. The actuator system may, for example, encompass a steering or brake actuator or an engine control unit. The evaluation unit may also be designed to control the road user based on maneuver messages provided by other road users and received via the communication network.

The sensor system may, for example, encompass a camera, a radar sensor or a LIDAR sensor.

A communication network may be understood to mean a network for traffic linking, for example from vehicle to vehicle (V2V or Car2Car), from vehicle to road (V2R), from vehicle to infrastructure (V2I), from vehicle to network (V2N) or from vehicle to persons (V2P). For example, the maneuver messages may be transferred via a wireless communication link, such as, for example, a WLAN, Bluetooth® or mobile communication link, between users of the communication network.

The maneuver message may, for example, include information about the road user, for example about the steering angle, position, direction, velocity or degree of automation of the road user, as well as a list of possible trajectories.

A possible trajectory may be understood to mean a presumable course of the vehicle, for example a course of a position, velocity, acceleration and/or direction over the time, which was calculated based on past, current and/or estimated future states of the road user and/or of recognized objects in the surroundings of the road user. The calculation may take place, for example, by a surroundings model.

Based on the trajectory transfer priority, it is possible to determine, for example, whether or not the possible trajectory is to be adopted into a list of trajectories to be transferred. In this way, the maneuver message may be generated with the list of the trajectories to be transferred.

A second aspect of the present invention relates to an evaluation unit which is designed to carry out the method as described above and below. Features of the method, as described above and below, may also be features of the evaluation unit.

Further aspects of the present invention relate to a computer program which, when executed on a processor, carries out the method as described above and below, as well as to a computer-readable medium on which such a computer program is stored.

The computer-readable medium may, for example, be a hard drive, a USB memory device, a RAM, a ROM, an EPROM or a flash memory. The computer-readable medium may also be a data communication network enabling a download of program code, such as for example the Internet. The computer-readable medium may be transitory or non-transitory.

Features of the method, as described above and below, may also be features of the computer program and/or of the computer-readable medium.

Features regarding specific embodiments of the present invention may, among other things, be considered to be based on the concepts and findings described hereafter.

According to one specific embodiment of the present invention, costs, which indicate a benefit of the possible trajectory for the road user, may be determined. In the process, the trajectory transfer priority may be calculated from the costs. Using the costs, a functional benefit of the possible trajectory for the road user may be quantified. For example, the lower the costs, the higher the trajectory transfer priority may be.

In addition or as an alternative, a data volume assigned to the possible trajectory may be determined, and the trajectory transfer priority may be calculated from the data volume. The data volume which is required to describe the possible trajectory allows a conclusion to be drawn of a degree of detail of the possible trajectory, for example of a trajectory length or a complexity of a trajectory profile, which may be described, for example, by a polynomial function. For example, the smaller the data volume assigned to the possible trajectory, the higher the trajectory transfer priority may be.

In addition or as an alternative, a waiting period since the last time a maneuver message with respect to a possible trajectory was sent may be determined, and the trajectory transfer priority may be calculated from the waiting period. For example, the longer the waiting period, the higher the trajectory transfer priority may be.

In addition or as an alternative, the possible trajectory may be assigned to a maneuver class made up of multiple different maneuver classes having different maneuver priorities, and the trajectory transfer priority may be calculated from the maneuver priority of the maneuver class assigned to the possible trajectory. For example, the higher the maneuver priority of the maneuver class assigned to the possible trajectory, the higher the trajectory transfer priority may be.

According to one specific embodiment of the present invention, objects in the surroundings of the road user may be recognized based on the communication data and/or the sensor data. In the process, the at least one possible trajectory may be determined as a function of the recognized objects.

According to one specific embodiment of the present invention, at least one object trajectory may be determined for at least one recognized object. Based on the object trajectories, it may be determined whether the possible trajectory is collision-free with all object trajectories. If the possible trajectory is collision-free, a minimum trajectory distance between the possible trajectory and all object trajectories may be determined, and the trajectory transfer priority may be calculated from the minimum trajectory distance. For example, the larger the minimum trajectory distance, the lower the trajectory transfer priority may be. If the possible trajectory is not collision-free, additionally or alternatively a shortest time period until a possible collision of the road user, also referred to as time to collision (TTC), may be determined, based on the possible trajectory and at least one trajectory with which the possible trajectory collides, and the trajectory transfer priority may be calculated from the shortest time period until a possible collision of the road user. For example, the longer the minimum TTC, the lower the trajectory transfer priority may be.

According to one specific embodiment of the present invention, a relative velocity and/or a relative acceleration, i.e., a difference between the absolute velocities or accelerations at a certain point in time, between the possible trajectory and the object trajectories may be calculated. The trajectory transfer priority may then be calculated from the relative velocity and/or the relative acceleration. For example, the higher the relative velocity and/or the relative acceleration, the higher the trajectory transfer priority may be.

According to one specific embodiment of the present invention, multiple possible trajectories of the road user may be determined as a function of the recognized objects. Costs which indicate a benefit of the possible trajectory for the road user may be determined for each possible trajectory. Furthermore, at least one object trajectory may be determined for each recognized object. Based on the object trajectories, it is possible to determine whether the possible trajectories are collision-free with the object trajectories. Based on the costs and based on whether the possible trajectories are collision-free, the possible trajectories may be divided into reference trajectories, needs trajectories and/or alternative trajectories, the reference trajectories being collision-free among one another, the needs trajectories not being collision-free with at least one reference trajectory and having lower costs than the reference trajectories, and the alternative trajectories not being collision-free with at least one reference trajectory and having higher costs than the reference trajectories. For the reference trajectories, higher trajectory transfer priorities may be calculated than for the needs trajectories and the alternative trajectories.

A reference trajectory may be understood to mean a trajectory having costs $C_{RT}$ which the road user is presently following. The reference trajectory may be considered to be collision-free if possible collisions may be resolved based on traffic rules.

A needs trajectory may be understood to mean a trajectory having costs $C_R<C_{RT}$. A needs trajectory may, in some circumstances, impair trajectories of other road users, which may necessitate a corresponding coordination between the road users. A needs trajectory may thus be interpreted as a cooperation request. If a needs trajectory collides with reference trajectories of other road users to which the needs trajectory was sent, the affected reference trajectories may, for example, be changed within the scope of a maneuver coordination in such a way that the needs trajectory no longer collides therewith. In this case, the needs trajectory may become a reference trajectory for those road users who sent the needs trajectory.

An alternative trajectory may be understood to mean a trajectory having costs $C_A>C_{RT}$. An alternative trajectory may be considered a cooperation offer for other road users.

According to the IMAGinE approach mentioned above, for example, all road users transfer their respective reference trajectory and at least one alternative or needs trajectory. The number of transferred alternative and needs trajectories may vary as a function of a driver's willingness to cooperate or of external factors, such as, for example, automobile manufacturers or regulations.

Such a Maneuver Coordination Service, on the one hand, offers the advantage that surroundings models of involved road users may be considerably improved, based on the provided reference trajectories. On the other hand, maneuvers may be matched to one another, and the traffic efficiency and safety may thus be enhanced. A utilization of a V2X channel via which the road users communicate with one another may, in particular, vary as a function of a respective number, a respective degree of detail, and a respective transfer frequency of the trajectories. An increasing channel load may, in some circumstances, result in a performance deterioration of the V2X communication, which, in turn, may cause the Maneuver Coordination Service and possibly also other V2X services to only be usable to a limited extent. In particular, such an increased channel load may result in greater latencies, a reduced range, and a decreased reliability. This problem may be largely avoided by a targeted selection of reference, needs, or alternative trajectories to be transferred.

According to one specific embodiment of the present invention, a ratio may be calculated from a number of the needs trajectories and a number of the alternative trajectories. The ratio may be compared to a comparative value. If the ratio is greater than the comparative value, higher trajectory transfer priorities may be calculated for the alternative trajectories than for the needs trajectories. If the ratio is smaller than the comparative value, additionally or alternatively higher trajectory transfer priorities may be calculated for the needs trajectories than for the alternative trajectories. The comparative value may be an equilibrium constant, for example, which represents a balanced ratio between needs and alternative trajectories. In other words, the comparative value may express a ratio in which needs and alternative trajectories are weighted equally.

According to one specific embodiment of the present invention, multiple further trajectories sent by the further road user via the communication network may be received in the evaluation unit. Based on the further trajectories, a type and/or number of trajectories colliding with the possible trajectory may be determined. The trajectory transfer priority may then be calculated from the type and/or number of trajectories colliding with the possible trajectory. In this way, the trajectory transfer priority may be calculated as a function of trajectories of further road users, for example neighboring vehicles. In this way, the accuracy and reliability of the method may be enhanced.

According to one specific embodiment of the present invention, the further trajectories may encompass reference trajectories, needs trajectories and/or alternative trajectories, as they are described in greater detail above. In the process, the trajectory transfer priority may be calculated from a number of the reference trajectories, a number of the needs trajectories and/or a number of the alternative trajectories. In other words, it is possible to count how many reference trajectories, needs trajectories and/or alternative trajectories were received, for example from neighboring vehicles in the surroundings of the road user. Conclusions may then be drawn regarding the relevance of the possible trajectory from the respective number or from the combination of the respective numbers.

According to one specific embodiment of the present invention, at least one additional possible trajectory of the road user may be determined based on the communication data and/or the sensor data. In the process, at least one additional trajectory parameter describing a property of the additional possible trajectory may be ascertained. An additional trajectory transfer priority may then be calculated from the additional trajectory parameter, which represents a relevance of the additional possible trajectory for the road user and/or the further road user. Furthermore, the trajectory transfer priority and the additional trajectory transfer priority may be compared to one another. When the additional trajectory transfer priority is greater than the trajectory transfer priority, a minimum deviation between the possible trajectory and the additional possible trajectory, for example a minimum difference between the position, velocity or acceleration in the two trajectories, may be determined. Thereafter, the trajectory transfer priority may be recalculated, based on the minimum deviation. For example, the larger the minimum deviation, the higher the trajectory transfer priority may be. In this way, it is possible to achieve, among other things, that trajectories which are considerably different from one another are preferentially transferred.

BRIEF DESCRIPTION OF THE DRAWINGS

Specific embodiments of the present invention are described hereafter with reference to the figures; neither the figures nor the description should be interpreted as limiting the present invention.

The figures are only schematic representations and are not true to scale. Identical reference numerals denote identical or equally acting features in the figures.

DETAILED DESCRIPTION OF EXAMPLE EMBODIMENTS

Figure 1:
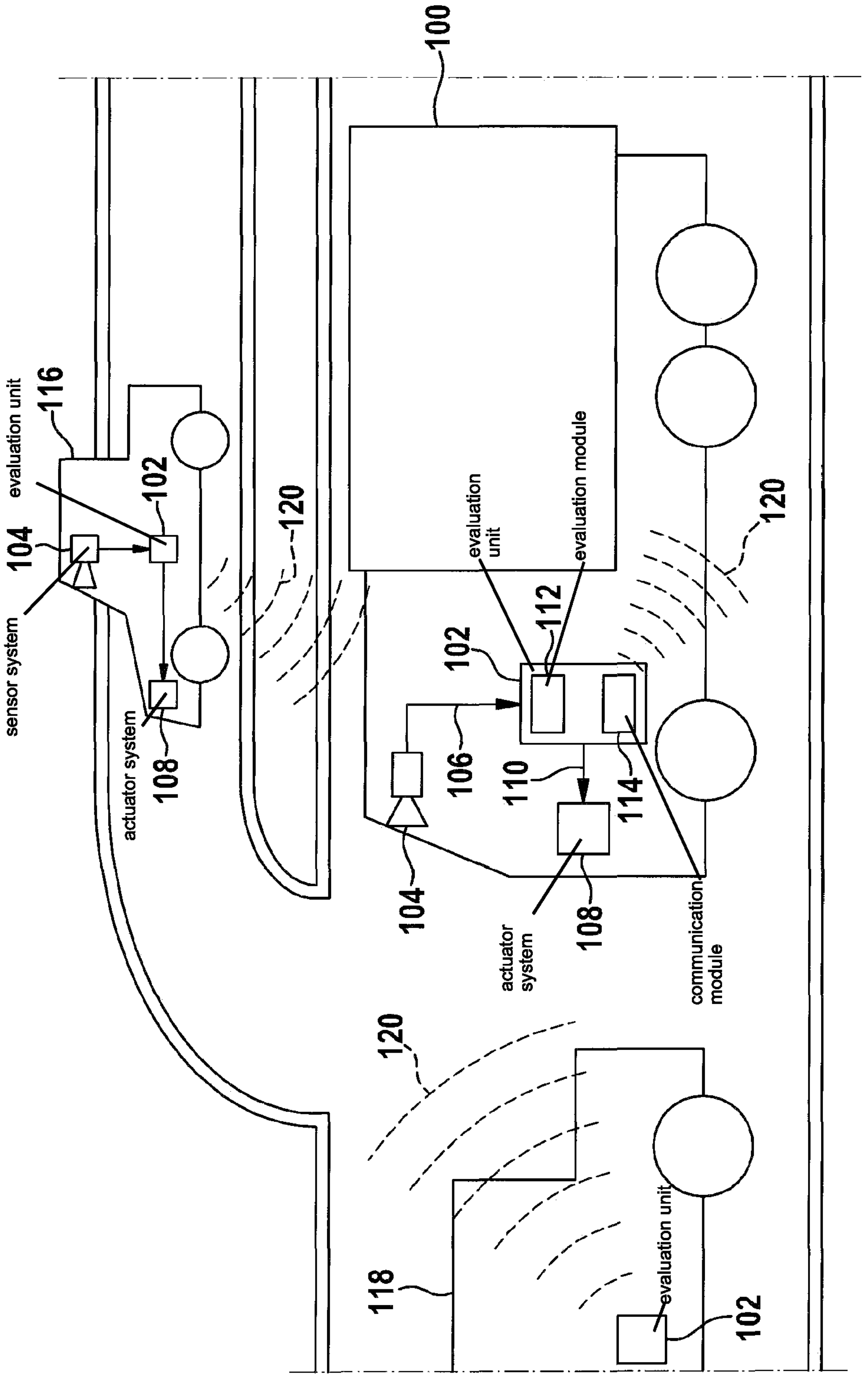
FIG. 1 schematically shows a vehicle including an evaluation unit according to one exemplary embodiment of the present invention.

FIG. 1 shows a vehicle 100 including an evaluation unit 102, which is connected to a sensor system 104 of vehicle 100, to process sensor data 106 generated by sensor system 104. Sensor system 104 is designed to monitor surroundings of vehicle 100. Sensor system 104 is implemented as a camera here by way of example. However, sensor system 104 may also include multiple, different sensor units. In this way, sensor system 104, in addition or as an alternative to a camera, may, for example, include at least one radar sensor, LIDAR sensor or ultrasonic sensor or a V2X communication system.

Furthermore, evaluation unit 102 is connected to an actuator system 108 of vehicle 100. Actuator system 108 may, for example, encompass a steering or brake actuator or an actuator for engine control. Evaluation unit 102 may be designed to generate, based on sensor data 106, a control signal 110 for activating actuator system 108 in order to control, i.e., to steer, to decelerate, to accelerate, vehicle 100 in an automated manner or to navigate it according to a predefined route in a digital map. In addition or as an alternative, evaluation unit 102 may be designed to generate a signal for driver information based on sensor data 106.

Evaluation unit 102 includes an evaluation module 112 and a communication module 114 which is connected to the evaluation module and configured to transfer data via a communication network. The communication network links vehicle 100 to further vehicles 116, 118, for example via a wireless communication link. Modules 112, 114 may be implemented as hardware and/or software.

Evaluation module 112 is configured to receive sensor data 106 from sensor system 104, and to process and evaluate these data for recognizing objects in the surroundings of vehicle 100. In this example, evaluation module 112, based on sensor data 106, recognizes further vehicles 116, 118. For example, evaluation module 112 recognizes a respective position, velocity, and object class of further vehicles 116, 118. Taking these positions, velocities, and object classes into consideration, evaluation module 112 furthermore calculates at least one possible trajectory of vehicle 100, at least one trajectory parameter, which describes a property of the possible trajectory in greater detail, being determined. Based on the trajectory parameter, evaluation module 112 calculates a trajectory transfer priority $p_t$, which indicates how relevant, for example how useful, the possible trajectory is for vehicle 100, or also for further vehicles 116, 118. Depending on the level of the trajectory transfer priority $p_t$, evaluation module 112 determines whether or not the possible trajectory is to be included in a list of trajectories to be transferred. As an alternative, the list of trajectories including priority values is transferred to communication module 114, and communication module 114 decides, for example based on the channel load, how many and which trajectories are actually sent. From the finished list, communication module 114 finally creates a maneuver message 120 and sends it via the communication network to further vehicles 116, 118. These may be configured similarly to vehicle 100 to recognize their respective surroundings with the aid of sensors and, in turn, to send corresponding maneuver messages 120 via the communication network. With the aid of maneuver messages 120, for example, a maneuver between vehicles 100, 116, 118 may be coordinated, as is illustrated by way of example in FIG. 3 based on vehicles 100, 116.

Figure 2:
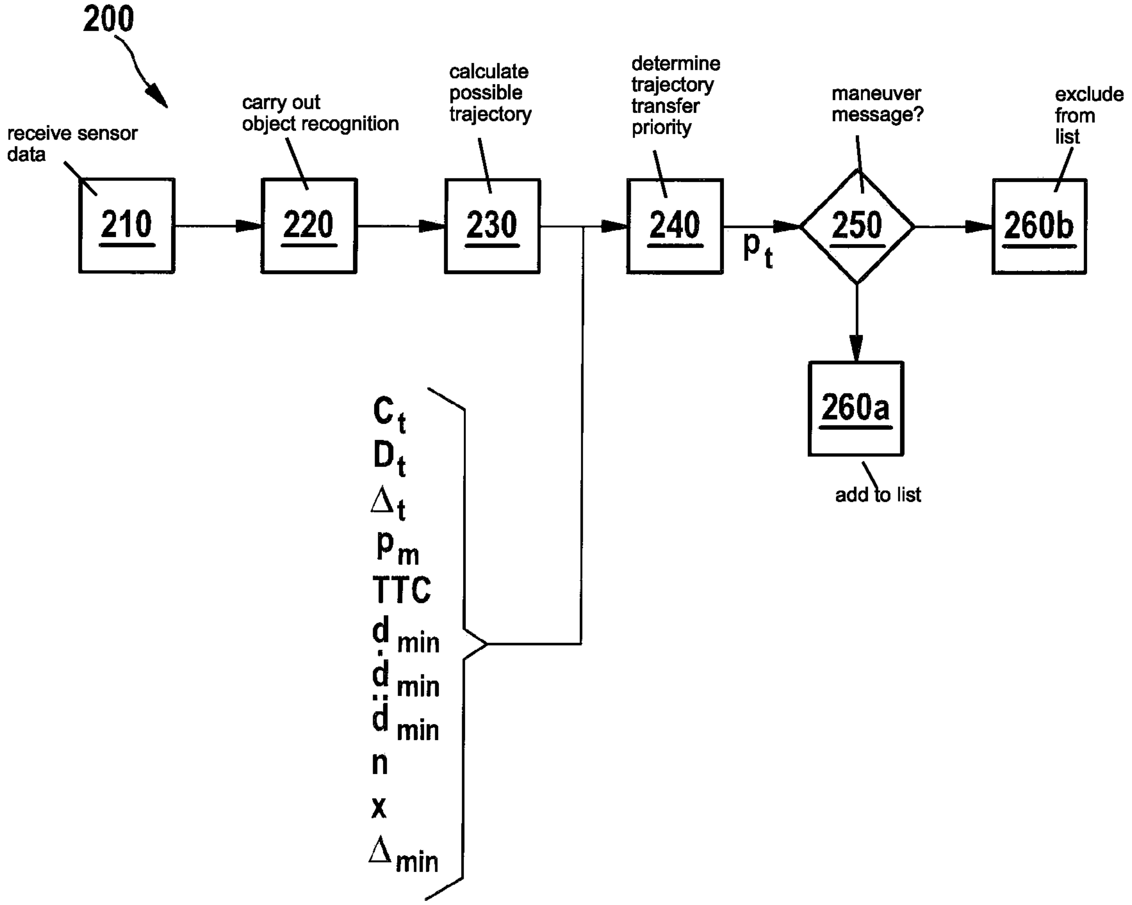
FIG. 2 shows a flowchart of a method according to one exemplary embodiment of the present invention.

FIG. 2 shows a flowchart of a method 200 which may be carried out, for example, by evaluation unit 102 from FIG. 1.

In the process, in a first step 210, sensor data 106 are received.

In a second step 220, an object recognition is carried out based on sensor data 106.

In a third step 230, at least one possible trajectory of vehicle 100 is calculated based on the recognized objects. In the process, at least one of the following trajectory parameters with respect to the calculated trajectory is determined: costs $C_t$ of the possible trajectory, data volume $D_t$ which is required to describe the possible trajectory, waiting period $\Delta t$ since the last time a maneuver message with respect to the possible trajectory was sent, maneuver priority $p_m$ of a maneuver class assigned to the possible trajectory, shortest time period TTC until a possible collision of the possible trajectory with other trajectories, minimum trajectory distance $d_{min}$ between the possible trajectory and other trajectories and/or maximum distance of at least one variable $\dot{d}_{max}, \ddot{d}_{max}$ derived therefrom, type and/or number n of the possible trajectories, type and/or number X of received trajectories, minimum deviation $\Delta_{min}$ of the possible trajectory from other possible trajectories having a higher trajectory transfer priority $p_t$.

In a fourth step 240, trajectory transfer priority $p_t$ with respect to the possible trajectory is determined based on the at least one trajectory parameter.

In a fifth step 250, it is determined based on trajectory transfer priority $p_t$ whether or not the possible trajectory is to be the subject matter of a maneuver message.

If so, the possible trajectory is adopted into a list of trajectories to be transferred in a step 260*a*. Maneuver message 120 is then generated from this list.

If not, the possible trajectory is excluded from the list of trajectories to be transferred in a step 260*b*. Maneuver message 120 is then, for example, generated without the trajectory.

For example, it is possible that a trajectory planner of vehicle 100 provides various possible trajectories including their respective costs $C_t$. For each trajectory, a trajectory transfer priority $p_t$ is calculated, which depends, among other things, on the following criteria or parameters.

1. How High are Costs $C_t$ of the Trajectory?

Costs $C_t$ for each trajectory are estimated by a maneuver planner, for example. The lower costs $C_t$, the greater is a benefit of the trajectory, and the greater is its trajectory transfer priority $p_t$:

$$p_t \left| \frac{\partial p_t(C_t)}{\partial C_t} \leq 0 \right.$$

In other words, trajectory transfer priority $p_t$ is selected in such a way that it decreases, or does not further increase, with increasing costs $C_t$ of the trajectory, with conditions otherwise remaining the same.

2. What Type of Trajectory is it?

Based on their respective costs $C_t$ and based on whether the possible trajectories are collision-free, the trajectories may be divided into reference trajectories, needs trajectories and alternative trajectories, as was already described above.

Reference trajectories (ref) should always be transferred. As a result, reference trajectories receive the highest trajectory transfer priority $p_t$. Trajectory transfer priority $p_t$ of alternative trajectories (alt) and needs trajectories (req) are selected according to their ratio with respect to one another:

$$p_t \mid p_t(ref) > \begin{cases} p_t(alt) \geq p_t(req) & \frac{n_{req}}{n_{alt}} \geq \text{equilibrium constant} \\ p_t(req) > p_t(alt) & \frac{n_{req}}{n_{alt}} < \text{equilibrium constant} \end{cases}$$

In other words, trajectory transfer priority $p_t$ is selected in such a way that reference trajectories have a higher trajectory transfer priority $p_t$ than alternative and needs trajectories, with conditions otherwise remaining the same. In the process, alternative trajectories have a transfer priority which is at least as high as needs trajectories when a ratio between a number $n_{req}$ of the needs trajectories and a number $n_{alt}$ of the alternative trajectories is greater than or equal to a certain equilibrium constant. If the ratio is smaller than the equilibrium constant, conversely the needs trajectories have a higher transfer priority than the alternative trajectories.

3. What Data Volume is Required for Describing the Trajectory?

The higher the degree of detail with which a trajectory is described, the higher is, in general, a channel load caused thereby. For example, it is possible that, at a low channel load, all trajectories are transferred, regardless of their respective trajectory transfer priority $p_t$. In the case of a high channel load, trajectory transfer priority $p_t$ of high-load trajectories may be reduced to reduce the channel load. In other words, the higher a data volume $D_t$ which is required for describing a trajectory, the lower a trajectory transfer priority $p_t$ may be selected:

$$p_t \left| \frac{\partial p_t(D_t)}{\partial D_t} \leq 0 \right.$$

In other words, trajectory transfer priority $p_t$ decreases, or does not further increase, with increasing data volume and with conditions otherwise remaining the same.

4. How Much Time has Elapsed Since the Last Transfer of the Trajectory?

The longer the neighboring vehicles 116, 118 are not informed about a relevant trajectory, the higher trajectory transfer priority $p_t$ in this regard should be:

$$p_t \left| \frac{\partial p_t(\Delta t)}{\partial \Delta t} \geq 0 \right.$$

In other words, trajectory transfer priority $p_t$ increases with increasing temporal distance Δt with respect to the last transfer, with conditions otherwise remaining the same.

5. How Relevant is the Trajectory for Other Vehicles when the Trajectory is Collision-Free?

Trajectory transfer priority $p_t$ may be calculated as a function of states of other vehicles 116, 118 relative to the trajectory. Trajectories which extend at a smaller distance $d_{min}(t)$ with respect to other vehicles 116, 118 receive an accordingly higher trajectory transfer priority $p_t$. Distance $d_{min}(t)$ may be defined as the minimum distance between future positions of objects in the surroundings model of vehicle 100 and of the considered trajectory for each time step of a relevant time period in the future. First and higher order derivatives of $d_{min}(t)$, which influence the risk of a collision of the vehicle with other objects, are also taken into consideration, such as, for example, a relative velocity $d_{min}$ or a relative acceleration $d_{min}$:

$$p_t \left| \frac{\partial p_t(d_{min}(t))}{\partial d_{min}} \geq 0 \wedge \frac{\partial p_t(\dot{d}_{min}(t))}{\partial \dot{d}_{min}} \geq 0 \wedge \frac{\partial p_t(\ddot{d}_{min}(t))}{\partial \ddot{d}_{min}} \geq 0 \wedge \ldots \right.$$

In other words, the smaller an (expected) minimum distance between ego-vehicle 100 which follows the trajectory and all other road users, the higher trajectory transfer priority $p_t$, with conditions otherwise remaining the same. Furthermore, trajectory transfer priority $p_t$ is selected in such a way that, with conditions otherwise remaining the same, it increases, or does not decrease with increasing maximum relative velocity and/or increasing variables derived therefrom.

6. How Much Time is Available for a Maneuver Coordination when the Trajectory Collides with at Least One Trajectory of Another Vehicle?

For this purpose, the shortest time until a collision, also referred to as time to collision or TTC, between the trajectory and all other colliding trajectories is ascertained. The shorter the time until the collision, the higher trajectory transfer priority $p_t$:

$$p_t \left| \frac{\partial p_t(TTC)}{\partial TTC} \leq 0 \right.$$

In other words, trajectory transfer priority $p_t$ decreases, or does not increase, with increasing time until the collision, with conditions otherwise remaining the same.

7. How Many Trajectories of which Trajectory Type Collide with the Trajectory?

Trajectory transfer priority $p_t$ of the considered trajectory is not only dependent on its own trajectory type, but also on a number and type of trajectories colliding therewith. If the trajectory, for example, collides with one reference trajectory ($x_{ref}$=1), two needs trajectories ($x_{reg}$=2) and one alternative trajectory ($x_{alt}$=1), which are transferred from other vehicles 116, 118 to vehicle 100, the trajectory receives a higher trajectory transfer priority $p_t$ than if it only collided with one alternative trajectory ($x_{alt}$=1). In general, collisions with reference trajectories have a greater impact, or at least the same impact, on trajectory transfer priority $p_t$ than collisions with alternative and needs trajectories. Furthermore, the greater the number of collisions with trajectories of a certain trajectory type, the higher is trajectory transfer priority $p_t$:

$$p_t \left| \frac{\partial p_t(x_{ref})}{\partial x_{ref}} \geq \left\{ \begin{matrix} \frac{\partial p_t(x_{req})}{\partial x_{req}} \\ \frac{\partial p_t(x_{alt})}{\partial x_{alt}} \end{matrix} \right\} \geq 0 \right.$$

In other words, trajectory transfer priority $p_t$ increases with an increasing number of collisions with alternative or needs trajectories. Trajectory transfer priority $p_t$ also increases with the increasing number of collisions with reference trajectories, the influence of the reference trajectories on trajectory transfer priority $p_t$ being at least as great as the influence of the alternative or needs trajectories.

8. Which Maneuver Class is Described by the Trajectory?

A maneuver which is based on the trajectory may be assigned to a certain maneuver class having a maneuver priority $p_m$. With conditions otherwise remaining the same, trajectory transfer priority $p_t$ increases with increasing maneuver priority $p_m$:

$$p_t \left| \frac{\partial p_t(p_m)}{\partial p_m} \geq 0 \right.$$

9. How does the Trajectory Differ from Trajectories Having Higher Trajectory Transfer Priorities $p_t$?

In the context of a cooperation between multiple vehicles, it is generally not very useful when a trajectory is transferred which approximately describes the same future states as other trajectories having a higher trajectory transfer priority $p_t$ than when an unambiguous trajectory is transferred. When multiple trajectories are similar, the trajectory having the greatest trajectory transfer priority $T_{max}$ among them is identified. Trajectory transfer priority $p_t$ is then reduced for all similar trajectories, except for $T_{max}$ The smaller difference $\Delta_{min}$ of the trajectory to $T_{max}$, the lower is trajectory transfer priority $p_t$.

$$p_t \left| \frac{\partial p_t(\Delta_{min})}{\partial \Delta_{min}} \geq 0 \right.$$

In other words, with increasing deviation from all other trajectories to be transferred, trajectory transfer priority $p_t$ increases, with conditions otherwise remaining the same.

The list of trajectories including their respective trajectory transfer priorities $p_t$ is transferred, for example periodically, to a priority-based DCC protocol in communication module 114, which, as a function of trajectory transfer priorities $p_t$ and a current channel utilization, selects which trajectories are to be transferred in maneuver message 120.

If, due to high channel utilization, for example, it should only be possible to transfer one reference trajectory, the other vehicles 116, 118 may be informed about this. For example, other vehicles 116, 118 may then receive a piece of information that vehicle 100 is planning a maneuver and that, even though needs trajectories are available, these cannot be transferred due to high channel utilization.

Figure 3:
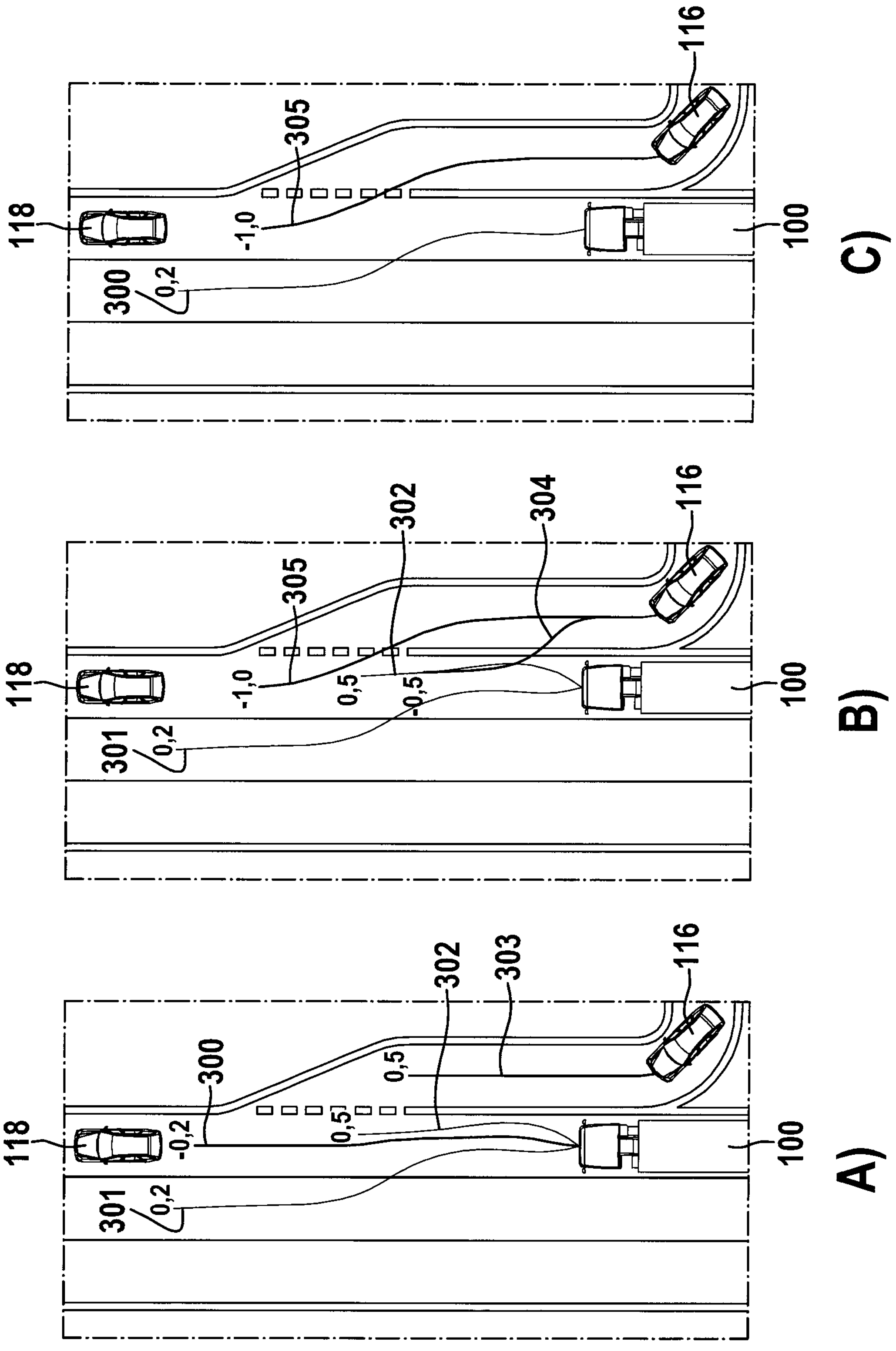
FIG. 3 schematically shows a maneuver coordination based on the method from FIG. 2.

FIG. 3, by way of example, shows a maneuver coordination between the two vehicles 100, 116 from FIG. 1. Each of the vehicles is equipped with sensor system 104 and evaluation unit 102. Possible trajectories of the vehicles are denoted by solid lines. The respective costs of the possible trajectories are represented as a positive or negative decimal number.

At a point in time A, vehicle 100 sends a reference trajectory 300 and two alternative trajectories 301, 302. Further vehicle 116 is in the process of entering an expressway on which vehicle 100 is situated. The entering vehicle 116 sends a reference trajectory 303.

At a point in time B, the entering vehicle 116 recognizes a cooperation need and accordingly calculates and sends two needs trajectories 304, 305, which are collision-free with respect to alternative trajectories 301, 302 send by vehicle 100.

At a point in time C, vehicle 100 accepts needs trajectory 305 having the lowest costs and accordingly adapts its reference trajectory 300. The entering vehicle 116 selects needs trajectory 305 as its new reference trajectory.

The described trajectories are, for example, transferred in maneuver messages 120, as they may be generated with the aid of the method from FIG. 2.

In closing, it shall be pointed out that terms such as "including," "having," etc. do not exclude other elements or steps, and that terms such as "a" or "an" do not exclude a plurality.

What is claimed is:

1. A method for providing a maneuver message for coordinating a maneuver between a road user and at least one further road user in a communication network, the road user and the at least one further road user being linked to one another via the communication network, the road user including an evaluation unit configured to evaluate communication data received via the communication network and/or sensor data generated by a sensor system for detecting surroundings of the road user, and to transfer maneuver messages via the communication network, the method comprising the following steps:

receiving the communication data and/or the sensor data in the evaluation unit;

determining at least one possible trajectory of the road user based on the communication data and/or the sensor data, at least one trajectory parameter describing a property of the at least one possible trajectory being ascertained;

calculating a trajectory transfer priority from the trajectory parameter, the trajectory transfer priority representing a relevance of the at least one possible trajectory for the road user and/or the further road user;

determining, based on the trajectory transfer priority, whether the at least one possible trajectory is to be included in a maneuver message;

based on determining the at least one possible trajectory is to be included in the maneuver message, generating the maneuver message including the at least one possible trajectory, and sending the maneuver message via the communication network; and coordinating, by an actuator, a movement of the road user and a movement of the further user based at least on the maneuver message, wherein objects in the surroundings of the road user are recognized based on the communication data and/or the sensor data, the at least one possible trajectory being determined as a function of the recognized objects, wherein:

multiple possible trajectories of the road user are determined as a function of the recognized objects;

costs, which indicate a benefit of the possible trajectory for the road user, are determined for each of the possible trajectories;

based on the object trajectories, at least one object trajectory is determined for each of the recognized objects;

based on the object trajectories, it is determined whether the possible trajectories are collision-free;

based on the costs and based on whether the possible trajectories are collision-free, the possible trajectories are divided into reference trajectories and/or needs trajectories and/or alternative trajectories, the reference trajectories being collision-free, the needs trajectories not being collision-free and having lower costs than the reference trajectories, and the alternative trajectories not being collision-free and having higher costs than the reference trajectories; and higher trajectory transfer priorities are calculated for the reference trajectories than for the needs trajectories and the alternative trajectories.

2. The method as recited in claim 1, wherein:

costs, which indicate a benefit of the at least one possible trajectory for the road user, are determined, the trajectory transfer priority being calculated from the costs; and/or a data volume which is assigned to the at least one possible trajectory, is determined, the trajectory transfer priority being calculated from the data volume; and/or a waiting period since a last time a maneuver message with respect to the at least one possible trajectory was sent is determined, the trajectory transfer priority being calculated from the waiting period; and/or the at least one possible trajectory is assigned to a maneuver class made up of multiple different maneuver classes having different maneuver priorities, the trajectory transfer priority being calculated from the maneuver priority of the maneuver class assigned to the at least one possible trajectory.

3. The method as recited in claim 1, wherein:

at least one object trajectory is determined for at least one recognized object; it being determined, based on the object trajectories, whether the at least one possible trajectory is collision-free; and when the at least one possible trajectory is collision-free: (i) determining a minimum trajectory distance between the at least one possible trajectory and the object trajectories, and (ii) calculating the trajectory transfer priority from the minimum trajectory distance; and/or when the at least one possible trajectory is not collision-free: (i) determining a shortest time period until a possible collision of the road user based on the at least one possible trajectory and at least one trajectory with which the at least one possible trajectory collides, and (ii) calculating the trajectory transfer priority from the shortest time period until a possible collision of the road user.

4. The method as recited in claim 3, wherein:

a relative velocity and/or a relative acceleration between the at least one possible trajectory and the object trajectories is calculated; and the trajectory transfer priority is calculated from the relative velocity and/or the relative acceleration.

5. The method as recited in claim 1, wherein:

a ratio of a number of the needs trajectories and a number of the alternative trajectories is calculated;

the ratio is compared to a comparative value;

when the ratio is greater than the comparative value: calculating higher trajectory transfer priorities for the alternative trajectories than for the needs trajectories, and/or when the ratio is smaller than the comparative value: calculating higher trajectory transfer priorities for the needs trajectories than for the alternative trajectories.

6. The method as recited in claim 1, wherein:

multiple further trajectories sent from the further road users via the communication network are received in the evaluation unit;

based on the further trajectories, a type and/or number of trajectories colliding with the at least one possible trajectory are determined; and the trajectory transfer priority is calculated from the type and/or number of the trajectories colliding with the at least one possible trajectory.

7. A method for providing a maneuver message for coordinating a maneuver between a road user and at least one further road user in a communication network, the road user and the at least one further road user being linked to one another via the communication network, the road user including an evaluation unit configured to evaluate communication data received via the communication network and/or sensor data generated by a sensor system for detecting surroundings of the road user, and to transfer maneuver messages via the communication network, the method comprising the following steps:

receiving the communication data and/or the sensor data in the evaluation unit;

determining at least one possible trajectory of the road user based on the communication data and/or the sensor data, at least one trajectory parameter describing a property of the at least one possible trajectory being ascertained;

calculating a trajectory transfer priority from the trajectory parameter, the trajectory transfer priority representing a relevance of the at least one possible trajectory for the road user and/or the further road user;

determining, based on the trajectory transfer priority, whether the at least one possible trajectory is to be included in a maneuver message:

based on determining the at least one possible trajectory is to be included in the maneuver message, generating the maneuver message including the at least one possible trajectory, and sending the maneuver message via the communication network; and coordinating, by an actuator, a movement of the road user and a movement of the further user based at least on the maneuver message, wherein:

multiple further trajectories sent from the further road users via the communication network are received in the evaluation unit;

based on the further trajectories, a type and/or number of trajectories colliding with the at least one possible trajectory are determined; and the trajectory transfer priority is calculated from the type and/or number of the trajectories colliding with the at least one possible trajectory, wherein:

multiple possible trajectories of the road user are determined as a function of the recognized objects;

Bluetooth®;

based on the object trajectories, at least one object trajectory is determined for each of the recognized objects;

based on the object trajectories, it is determined, whether the possible trajectories are collision-free;

based on the costs and based on whether the possible trajectories are collision-free, the possible trajectories are divided into reference trajectories and/or needs trajectories and/or alternative trajectories, the reference trajectories being collision-free, the needs trajectories not being collision-free and having lower costs than the reference trajectories, and the alternative trajectories not being collision-free and having higher costs than the reference trajectories;

higher trajectory transfer priorities are calculated for the reference trajectories than for the needs trajectories and the alternative trajectories;

the further trajectories encompass reference trajectories and/or needs trajectories and/or alternative trajectories; and the trajectory transfer priority is calculated from a number of the reference trajectories, and/or a number of the needs trajectories and/or a number of the alternative trajectories.

8. A method for providing a maneuver message for coordinating a maneuver between a road user and at least one further road user in a communication network, the road user and the at least one further road user being linked to one another via the communication network, the road user including an evaluation unit configured to evaluate communication data received via the communication network and/or sensor data generated by a sensor system for detecting surroundings of the road user, and to transfer maneuver messages via the communication network, the method comprising the following steps:

receiving the communication data and/or the sensor data in the evaluation unit;

determining at least one possible trajectory of the road user based on the communication data and/or the sensor data, at least one trajectory parameter describing a property of the at least one possible trajectory being ascertained;

calculating a trajectory transfer priority from the trajectory parameter, the trajectory transfer priority representing a relevance of the at least one possible trajectory for the road user and/or the further road user;

determining, based on the trajectory transfer priority, whether the at least one possible trajectory is to be included in a maneuver message;

based on determining the at least one possible trajectory is to be included in the maneuver message, generating the maneuver message including the at least one possible trajectory, and sending the maneuver message via the communication network; and coordinating, by an actuator, a movement of the road user and a movement of the further user based at least on the maneuver message, wherein:

at least one additional possible trajectory of the road user is determined based on the communication data and/or the sensor data;

at least one additional trajectory parameter describing a property of the additional possible trajectory is ascertained;

an additional trajectory transfer priority is calculated from the additional trajectory parameter, the additional trajectory transfer priority representing a relevance of the additional possible trajectory for the road user and/or the further road user;

the trajectory transfer priority and the additional trajectory transfer priority are compared to one another;

when the additional trajectory transfer priority is greater than the trajectory transfer priority: determining a minimum deviation between the possible trajectory and the additional possible trajectory, and recalculating the trajectory transfer priority based on the minimum deviation.

9. An evaluation unit, configured to provide a maneuver message for coordinating a maneuver between a road user and at least one further road user in a communication network, the road user and the at least one further road user being linked to one another via the communication network, the road user including the evaluation unit which is configured to evaluate communication data received via the communication network and/or sensor data generated by a sensor system for detecting surroundings of the road user, and to transfer maneuver messages via the communication network, the evaluation unit configured to:

receive the communication data and/or the sensor data in the evaluation unit;

determine at least one possible trajectory of the road user based on the communication data and/or the sensor data, at least one trajectory parameter describing a property of the at least one possible trajectory being ascertained;

calculate a trajectory transfer priority from the trajectory parameter, the trajectory transfer priority representing a relevance of the at least one possible trajectory for the road user and/or the further road user;

determine, based on the trajectory transfer priority, whether the at least one possible trajectory is to be included in a maneuver message;

based on determining the at least one possible trajectory is to be included in the maneuver message, generate the maneuver message including the at least one possible trajectory, and sending the maneuver message via the communication network; and coordinate, by an actuator, a movement of the road user and a movement of the further user based at least on the maneuver message, wherein objects in the surroundings of the road user are recognized based on the communication data and/or the sensor data, the at least one possible trajectory being determined as a function of the recognized objects, wherein:

multiple possible trajectories of the road user are determined as a function of the recognized objects;

Bluetooth®;

based on the object trajectories, at least one object trajectory is determined for each of the recognized objects;

based on the object trajectories, it is determined whether the possible trajectories are collision-free;

based on the costs and based on whether the possible trajectories are collision-free, the possible trajectories are divided into reference trajectories and/or needs trajectories and/or alternative trajectories, the reference trajectories being collision-free, the needs trajectories not being collision-free and having lower costs than the reference trajectories, and the alternative trajectories not being collision-free and having higher costs than the reference trajectories; and higher trajectory transfer priorities are calculated for the reference trajectories than for the needs trajectories and the alternative trajectories.

10. A non-transitory computer-readable medium on which is stored a computer program for providing a maneuver message for coordinating a maneuver between a road user and at least one further road user in a communication network, the road user and the at least one further road user being linked to one another via the communication network, the road user including an evaluation unit configured to evaluate communication data received via the communication network and/or sensor data generated by a sensor system for detecting surroundings of the road user, and to transfer maneuver messages via the communication network, the computer program, when executed by a processor, causing the processor to perform the following steps:

receiving the communication data and/or the sensor data in the evaluation unit;

determining at least one possible trajectory of the road user based on the communication data and/or the sensor data, at least one trajectory parameter describing a property of the at least one possible trajectory being ascertained;

calculating a trajectory transfer priority from the trajectory parameter, the trajectory transfer priority representing a relevance of the at least one possible trajectory for the road user and/or the further road user;

determining, based on the trajectory transfer priority, whether the at least one possible trajectory is to be included in a maneuver message; and based on determining the at least one possible trajectory is to be included in the maneuver message, generating the maneuver message including the at least one possible trajectory, and sending the maneuver message via the communication network; and coordinating, by an actuator, a movement of the road user and a movement of the further user based at least on the maneuver message, wherein objects in the surroundings of the road user are recognized based on the communication data and/or the sensor data, the at least one possible trajectory being determined as a function of the recognized objects, wherein:

multiple possible trajectories of the road user are determined as a function of the recognized objects;

Bluetooth®;

based on the object trajectories, at least one object trajectory is determined for each of the recognized objects;

based on the object trajectories, it is determined whether the possible trajectories are collision-free;

based on the costs and based on whether the possible trajectories are collision-free, the possible trajectories are divided into reference trajectories and/or needs trajectories and/or alternative trajectories, the reference trajectories being collision-free, the needs trajectories not being collision-free and having lower costs than the reference trajectories, and the alternative trajectories not being collision-free and having higher costs than the reference trajectories; and higher trajectory transfer priorities are calculated for the reference trajectories than for the needs trajectories and the alternative trajectories.

* * * * *